United States Patent Office 3,498,183
Patented Mar. 3, 1970

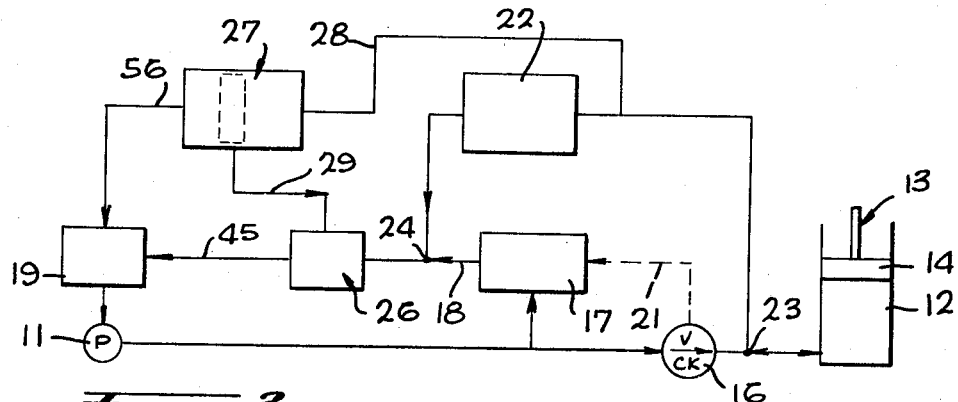
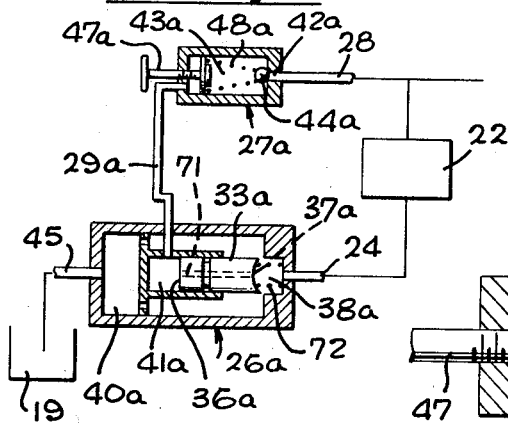
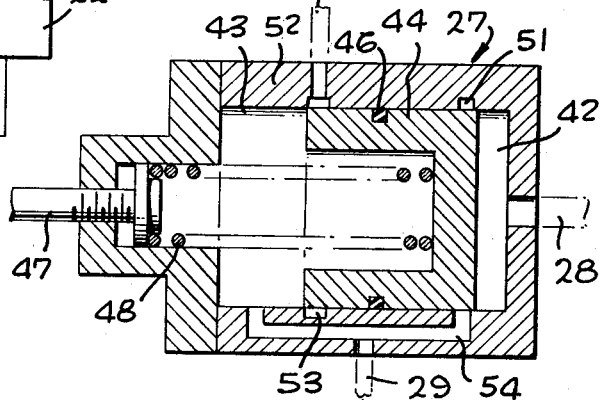
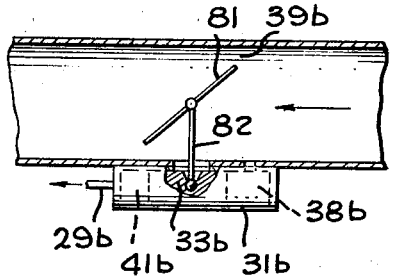
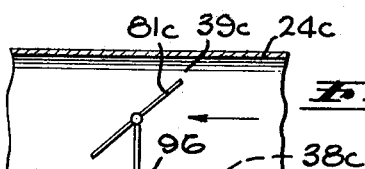
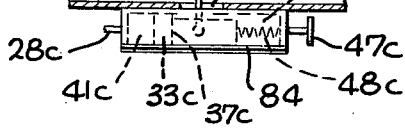

3,498,183
FLOW CONTROL FOR FLUID SYSTEM
Daniel W. Risk, Los Angeles, Calif., assignor to Coast Elevator Company, Los Angeles, Calif., a corporation of California
Continuation of application Ser. No. 611,741, Jan. 25, 1967. This application Apr. 7, 1969, Ser. No. 817,247
Int. Cl. F15b *13/024;* F16k *31/143, 31/38*
U.S. Cl. 91—48                              3 Claims

ABSTRACT OF THE DISCLOSURE

An elevator system has a ram to which hydraulic liquid under pressure is supplied by a pump, in order to raise the elevator. To lower the elevator, the hydraulic liquid is returned to a sump, under the control of valves, by-passing the pump. To maintain a substantially constant pressure drop across the control valves under varying loads on the elevator, a variable restriction is interposed between the control valves and sump. This restriction is controlled so as to produce a substantially constant pressure drop across the control valves.

---

This application is a continuation of application Ser. No. 611,741, filed Jan. 25, 1967 now abandoned.

BACKGROUND OF THE INVENTION

This invention pertains to the controlling of fluid flow in a system, particularly the flow of hydraulic liquid in an elevator system. Control is achieved by regulating a variable restriction in the hydraulic system which returns hydraulic liquid to the sump. This restriction is controlled in accordance with a sensing means which maintains a substantially constant pressure drop across the valves or controls which are interposed between the elevator and the sump. This substantially constant pressure drop is achieved in the face of widely varying input pressures to the control valves, such as result from varying loads on the elevator or other variable conditions in the elevator cylinder.

There are different rates of flow through the control valves, depending on the differing hydraulic pressures occasioned by differing loads in the elevator. This produces non-uniform reaction of the elevator in response to a given setting or actuation of the control valves, which is highly undesirable.

The present invention provides substantially uniform or consistent response of the elevator to any given control valve setting by providing a substantially constant pressure drop across the control or valve, irrespectively of wide variation in system pressure, such as would be occasioned by varying loads on the elevator.

Prior systems have attempted to solve this difficulty, but have for the most part been highly complex, expensive, and subject to unreliable operation largely because of such complexity. The present invetnion meets this problem in a relatively simple, inexpensive and reliable way.

SUMMARY

The present invention involves interposing a variable restriction in the hydraulic line betwen the control valves and the sump. The pressure drop across the control valves, i.e. the differential in pressure between a point immediately upstream of the control valves and a point immediately downstream of the control valves, is sensed. In accordance with this sensing, the variable restriction is actuated to maintain a substantially constant pressure drop across the valves. Preferred forms of the invention include a piston, to one end of which is applied a pressure which is a function of the pressure at the output or downstream of the control valves, i.e., that portion of the system which is to have the constant pressure drop. At the other end of the piston is applied a pressure which is a function of the pressure a the input or upstream of the valves.

The specific disclosure which follows illustrates the application of the present invention to an elevator system in which the pressure drop is controlled across the valving system that regulates the speed at which the elevator travels. In its broadest application, the present invention is applicable to any fluid system having a fluid conduit portion, herein called conduit means, across which it is desired to maintain substantially constant pressure drop.

BRIEF DESCRIPTION OF THE DRAWING

FIGURE 1 is a schematic diagram of a fluid system, specifically a hydraulic elevator system, into which the present invention has been incorporated;

FIGURE 2 is a cross-section view of those elements of FIGURE 1 which are the new elements to the combination constituting the present invention;

FIGURE 3 is an illustration of a second form of the invention;

FIGURE 4 is a third form of the invention; and

FIGURE 5 is a fourth form of the invention.

DESCRIPTION OF THE PREFERRED EMBODIMENTS

The environment in which the present invention resides is shown in FIGURE 1, wherein 11 represents a fluid pump such as a positive displacement pump for pumping oil or other hydraulic liquid to the cylinder 12 of an elevator 13 having an elevating ram or piston 14. When the elevator 13 is being raised, the pump 11 forces oil through the check valve 16 into the cylinder 12, raising the piston 14. The output of the pump 11 is substantially constant. The speed of elevation of the piston 14 is controlled by controlling the amount of oil by-passed, through a valve 17, back into a sump 19 by way of a fluid conduit or pipe 18. When the by-pass valve 17 is fully open, no oil flows to the cylinder 12, and the elevator 13 does not rise. As the by-pass valve 17 is shut down, more and more oil is forced into the cylinder 12, causing the elevator 13 to rise at a speed proportional to the amount which the valve 17 is shut down. The by-pass valve 17 may, in its control, involve the check valve 16 through a link shown schematically at 21. For a further understanding and an example of an "up" control for an elevator, reference is made to U.S. Patent 3,292,500.

When the elevator 13 is to be lowered, the hydraulic oil in the cylinder 12 is allowed to escape back to the sump 19 by means of a conduit system including various valving controls shown in block form by the numeral 22. This conduit system by-passes the check valve 16 and the by-pass valve 17, as shown. The degree or extent to which the valves within the control box 22 are opened or closed determines the rate at which the hydraulic oil escapes from the cylinder 12 and, hence, the rate of descent of the elevator 13.

Various circumstances, principally variation in physical load on the elevator 13, will cause wide variation in fluid pressure at the upstream or input side 23 of the valving system 22. In the absence of some corrective control, this would cause an undesirable variation in pressure drop across the valving system 22 as the load on the elevator 13 varies. Although isolated from the point 23 by the check valve 16 in one direction, the operation of the by-pass 17 is nonetheless affected by the pressure at the point 23, because the latter pressure enters into a determination of when the check valve 16 opens to place the

3 by-pass valve 17 in communication with the point 23. The elements 17 and 22 thus (together or separately) constitute what is sometimes called herein a conduit means, having an upstream or input end 23 and a downstream or discharge end 24. It is the purpose and function of the present invention to provide means for maintaining a substantially constant pressure drop from the point 23 to the point 24, irrespective of varying pressure at the input 23, such as might be occasioned by a varying load on the elevator 13.

The present invention involves the inter-position of a variable restriction, shown schematically at 26, between the exit or downstream point 24 and the sump 19, which latter is at substantially atmospheric or zero gauge pressure. By varying the extent of this restriction, the pressure drop from 23 to 24 can be maintained substantially constant. In accordance with the embodiment of the present invention exemplified in FIGURE 2, this is done by the incorporation of a differential sensing means 27 which senses the pressure at 23 through a sensing line 28 and also senses the pressure at 24 through a sensing line 29.

The elements 26 and 27 are shown in detail in FIGURE 2. The element 26 consists of a housing 31 having an internal framework which supports cylinder 32, within which reciprocates a piston 33. A seal 34 prevents fluid passage between the left-hand face 36 of the piston 33 and the right-hand face 37 thereof. The face 37 is dished inwardly as shown and registers with a cylindrical recess or chamber 38 in the wall of the housing 31, to which hydraulic oil is supplied from the point 24 in the hydraulic system. The annular passageway or orifice 39 between the peripheral edge of the face 37 and the edge of the recess 38 constitutes a variable restricting means for the hydraulic fluid, as the piston 33 moves back and forth. Hydraulic oil flows from chamber 38, through annulus 39, into the body chambers 35 and 40, and thence to sump 19 through pipe 45. The piston face 37 is exposed to the pressure at 24, and the piston face 36 is exposed to the pressure in the internal chamber 41, connected to the pressure differential element 27, by means of the pipe or conduit 29.

Since the effective areas of the faces 36 and 37 are the same, the piston 33 will be balanced when the pressures at 24 and 41 are equal.

The pressure differential means 27 has been so identified because its function is to establish the desired pressure differential or drop from the point 23 to the point 24 in the hydraulic system. To this end, the pressure line or conduit 28, as noted hereinbefore, is connected to the point 23 and thence to the right-hand side or chamber 42 of the differential means 27. The right-hand chamber 42 is separated from the left-hand chamber 43 by a piston 44 sealed with a conventional sealing ring 46. The left-hand chamber 43 is connected via the conduit 29 to the left-hand chamber 41 of the flow restrictor 26. Hence, the pressure is equal in the chambers 41 and 43. The pressure in the chamber 42 is maintained higher than that in the chamber 43 by a differential predetermined by the setting of an adjusting screw 47 which determines the force that a compression spring 48 applies against the left-hand face of the piston 44.

A pair of annular grooves or passages 51 and 53 are formed internally in the housing 52 of the pressure differential means 27. The annular passages 51 and 53 are spaced apart axially a distance slightly less than the length of the piston 44. The passage or groove 51 is connected by longitudinal passage 54 to the left-hand chamber 43 and, hence, to the conduit 29. The groove or passage 53 is connected via a pipe or conduit 56 to the sump 19. The aggregate force urging the piston 44 toward the right is equal to that brought about by the pressure in the chamber 43, plus the force of the spring 48. The force urging the piston 44 toward the left is brought about by the pressure in the chamber 42, which is the pressure in the conduit 28. When these two forces are equal, the piston is in balanced position, and both of the grooves 51 and 53 are closed off.

4

When the force in 42 increases, the piston 44 moves to the left, admitting fluid from the conduit 28 into the passages 51, 54, 29, and 41. When balance is re-established in a manner which will be described hereinafter, the piston 44 returns to its neutral or mid-position in which both passages 51 and 53 are blocked off.

OPERATION

Operation of the present invention may be readily understood by assuming a specific example in which it is desired to maintain say a 25 pound per square inch pressure drop from the point 23, across the conduit means, to the point 24. As noted hereinbefore, the conduit means comprises either or both of the valving assemblies 22 and 17. It will be assumed that the pressure at 23 is 75 pounds per square inch and that at 24 is 50 pounds per square inch. Under these conditions, the system is in balance, i.e. operating at the predetermined pressure differential (25 pounds per square inch) set by the adjusting screw 47. Under these conditions there will be 75 p.s.i. in conduit 28 and chamber 42, and 50 p.s.i. in chambers 43 and 41 and in conduit 24 connected to chamber 38. The differential in pressure between the chambers 42 and 43 is made up by the stress in the spring 48. The pressure across the piston 33 is balanced, being 50 p.s.i. in chamber 41 and 50 p.s.i. in chamber 38. Under these conditions there is a steady state flow of fluid, i.e. hydraulic oil, from the point 23, across the conduit means (assumed, for example, to be the "down" control valve 22), to the point or conduit 24, thence through the annular opening or orifice 39, into the chamber 35 and 40, conduit 45 and thence to the sump 19. Assuming negligible pressure drop from the chamber 35 downstream it will be apparent that there is approximately a 50 p.s.i. drop across the restricting annular orifice 39, inasmuch as the sump 19 is at zero p.s.i. gauge.

Let it now be assumed that conditions change so that the pressure at 23 increases to 125 p.s.i. This increased pressure would tend to increase the flow through the system and as a result increase the pressure in the conduit 24. At the same time, at the conduit 28 the pressure will be raised from 75 to 125 p.s.i. This new pressure differential will move the piston 44, in the pressure differential means 27, to the left. Hydraulic oil will thus flow into the annular groove 51 and from it into the chambers 43 and 41 until the forces acting on the piston 44 are equalized, whereupon the piston 44 will return to its neutral position. This will occur when the pressure in 43, and hence also in 41, has risen to 100 pounds, the differential being made up by the spring 48. Since the piston 44 in steady state always returns to its neutral position, the spring rate of the spring 48 does not enter into the picture.

With 100 pounds established in the chamber 41, the piston 33 must seek a position such that the pressure on the opposite face 37 is also 100 p.s.i. Thus, the piston 33 must of necessity adjust the annular orifice 39 so as to permit just that rate of flow through the valving 22 which produces a pressure differential thereacross of 25 pounds, i.e. from 125 pounds down to 100 pounds. Thus, equilibrium is again established with the rated 25 p.s.i. drop across the valving assembly 22.

Now assume that the pressure drops from 125 p.s.i. to 100 p.s.i. at the points 23 and 28. This will cause the piston 44 to move to the right in FIGURE 2 because of the force differential brought about by the spring 48; it being remembered that the pressure in the chamber 43 is still at 100 p.s.i. Rightward movement of the piston 44 opens the passage 53, venting some of the hydraulic oil in the chamber 43 to the sump through the conduit 56. This relieves the pressure in 43 and also in 41. The rate of flow of hydraulic oil through the assembly 22 will adjust itself until the pressure in 38 has dropped to 75 p.s.i. When this occurs, the pressure across the faces 36 and 37 will be balanced, by virtue of the fact that a 25 p.s.i. differential will simultaneously be established across the faces of the piston 44, such that when this differential is established the piston 44 reassumes its neutral position and closes the annular groove 53.

To change the pressure drop across the valving 22, it is only necessary to adjust the screw 47 which changes the force applied by the spring 48 to the piston 44. This changes the pressure differential established by the element 27 between the chambers 43 and 42.

SECOND EMBODIMENT

A second form of the invention is illustrated in FIGURE 3, where the same reference numerals followed by the letter $a$ will be used as for the embodiment shown in FIGURE 2, where there is some correspondence between the parts.

In FIGURE 3, the pressure differential means 27 of FIGURE 2 has been replaced by a simple ball check valve 27$a$ having a ball 44$a$ which is pressed by a spring 48$a$ against a seat, thus shutting off oil passage between the chamber 42$a$ fed by the conduit 28 and the chamber 43$a$ leading to the conduit 29$a$. No fluid will flow from 28 to 29$a$ until the pressure differential therebetween exceeds a predetermined value determined by the setting of the adjusting screw 47$a$. When this value is exceeded, the ball 44$a$ will be lifted from its seat and fluid will flow until the pressure differential drops to or below the predetermined value.

The restricting member 26$a$ of FIGURE 3 is substantially the same as the restricting means 26 of FIGURE 2, except that the piston valve 33$a$ has an axial passage 71 communicating from the chamber 41$a$ to the chamber 38$a$. This passage is larger than a capillary passage but still small enough that there is measurable pressure drop when fluid flows therethrough. Also a light spring 72 has been added, biasing piston 33$a$ toward the left.

The operation of this form of the invention will now be described again using by way of example an assumed pressure of 75 p.s.i. at point 28 and 50 p.s.i. at point 24. Let it be assumed further that the spring 48$a$ is set by the adjusting screw 47$a$ so that the ball 44$a$ lifts from its seat when there is a 24 p.s.i. differential from the chamber 42$a$ to the chamber 43$a$. Also, let it be assumed that the auxiliary spring 72 is of such a nature that a pressure drop or differential of 1 p.s.i. must be maintained from chamber 41$a$ to chamber 38$a$ in order to maintain the piston 33$a$ balanced. That is, the pressure on the face 36$a$ must be one p.s.i. higher than that on the face 37$a$ because of the spring 72.

Under these conditions the pressure in the conduit portions 43$a$, 29$a$, and 41$a$ will be 51 p.s.i., while that in the chamber 38$a$ will be 50 p.s.i., the same as in the conduit 24. There will be a slight fluid flow from left to right in the axial passage 71, just enough to create the pressure drop of 1 p.s.i., i.e. from 51 p.s.i. in 41$a$ to 50 p.s.i. in 38$a$. The valve 44$a$ will be cracked open just enough to provide this required fluid flow.

Assume as before that the pressure at 28 and 23 increases from 75 to 125 p.s.i. This will open the ball valve 44$a$ quite wide, admitting fluid to the chambers 43$a$ and 41$a$. When the pressure at 24 and 38$a$ rises to the desired 100 p.s.i., the system will then be restablished with pressure at 101 pounds in the chambers 43$a$ and 41$a$, pressure at 125 pounds at 42$a$, and pressure at 100 pounds at 38$a$. There is thus re-established the desired 25 p.s.i. drop across the valving assembly 22.

Also as before let it be assumed that the pressure drops from 125 p.s.i. to 100 p.s.i. at point 28. Hydraulic oil will continue to pass through the passage 71 from the chamber 41$a$ to the chamber 38$a$ by virtue of the 1-pound differential maintained by the spring 72. However, now no make-up fluid flows from the member 27$a$, because the pressure at 42$a$ is not high enough to open the ball check valve 44$a$. The spring 72 will thus move the valve 33$a$ to the left, thus widening the orifice 39$a$. This will transiently increase the flow of fluid through the valve assembly 22 until the point has been reached where the pressure drop across there is 25 p.s.i. At this point, the pressure at 28 will be 100 p.s.i., at 24 will be 75 p.s.i., and in 41$a$ and 43$a$ will be 76 pounds. Equilibrium will have again be re-established, with steady state flow, and a 25 p.s.i. drop across the valving apparatus 22.

THIRD EMBODIMENT

In FIGURE 4 a third form of the invention is shown which follows generally the pattern of the elements shown in FIGURE 2. A pressure differential means like that shown at 27 is used to supply controlled pressure to the conduit 29$b$. Within the housing 31$b$ is a piston 33$b$, to which the balanced pressures in the chambers 41$b$ and 38$b$, respectively are applied. The chamber 38$b$ communicates with the conduit 24 to receive fluid pressure therefrom. In the case of FIGURE 4, the controlled orifice 39, instead of being regulated by the position of the peripheral edge of the piston 33 as in FIGURE 2, is determined by a vane 81 actuated through a linkage 82 by the piston 33$b$. As in the case of FIGURE 2, the piston 33$b$ assumes a position such that the orifice 39$b$ (this being the peripheral space around the vane 81) is such as to produce a balanced pressure in the chambers 38$b$ and 41$b$, in the same way that the orifices 39 was automatically adjusted until a balanced pressure was achieved in the chambers 41 and 38.

FOURTH EMBODIMENT

In FIGURE 5 a fourth embodiment, somewhat similar to FIGURE 4, is shown, except that the functions of the elements 27 and 26 are combined in a single housing 84. In this case the piston 33$c$ has applied to its left-hand face the full line pressure from the line 28$c$, this being balanced by the force on the piston 33$c$ exerted by fluid from the conduit 24$c$, through an aperture 96, and thence against the right-hand face 37$c$ of the piston 33$c$. The differential in this case is established by a spring 48$c$ adjusted by the screw 47$c$. Thus, if the line or upstream pressure at 28$c$ is, for example, 75 p.s.i. there will be 75 p.s.i. in the chamber 41$c$ and 50 p.s.i. in the chamber 38$c$, the difference in force being made up by the spring 48$c$. As in the embodiment of FIGURE 4, the vane 81$c$ adjusts the passage or aperture 39$c$ to bring about equilibrium. In the embodiment of FIGURE 5, the piston 33$c$ will stabilize in different positions depending upon the upstream pressure at 28. This is necessary in order to bring about different positions of the vane 81$c$. Thus, the spring rate of the spring 48$c$ enters into the picture; so in order to maintain a constant pressure differential, the spring 48$c$ must be very long, or some other means must be taken to insure that the spring 48$c$ will exert a substantially constant force on the piston 33$c$ irrespective of the position of the piston. To the extent that this force is not constant under these conditions, the pressure differential from 28 to 24 will not be maintained perfectly constant.

What is claimed is:

1. In an hydraulic elevator system having a lift cylinder, a piston in said cylinder, a sump for hydraulic fluid, pump means for forcing fluid from said sump to said lift cylinder, first conduit means coupling said sump to said pump means, second conduit means coupling said pump to said lift cylinder, a by-pass valve having its inlet coupled to said second conduit means and having its outlet coupled to said sump for controlling the upward speed of said piston, and a further valve having its inlet coupled to said lift cylinder and having its outlet coupled to said sump for returning hydraulic fluid from said lift cylinder to said sump and for controlling the downward speed of said piston, the combination of:

variable fluid flow-restricting means interposed between said sump and the outlets of the aforesaid by-pass valve and further valve, and a pressure differential sensor interposed between said lift cylinder and said sump and coupled to said variable flow-restricting means and responsive to the fluid pressure in said lift cylinder to control the fluid flow restriction offered by said restricting means so as to maintain a substantially constant pressure drop across said by-pass valve and said further valve in the presence of varying loads on said piston.

2. The combination defined in claim 1 in which said pressure differential sensor includes a high pressure chamber coupled to said lift cylinder and a low pressure chamber, and a movable member therebetween, said movable member responding to pressure changes in said lift cylinder to shift its position and thereby provide a fluid flow between said sensor and said restricting means so as to control said restricting means and maintain a predetermined pressure differential between said low pressure chamber and said high pressure chamber.

3. The combination defined in claim 1 in which said pressure differential sensor includes a high pressure chamber coupled to said lift cylinder and a low pressure chamber, and a movable piston therebetween, said sensor also having passageways intercoupling said low pressure chamber and said high pressure chamber and coupled to said variable flow restricting means, said piston responding to pressure changes in said lift cylinder to shift its position and open and close said passageways thereby to control said restricting means so as to maintain a predetermined pressure differential between said low pressure chamber and said high pressure chamber.

References Cited
UNITED STATES PATENTS

| | | | |
|---|---|---|---|
| 2,374,568 | 4/1945 | Terry | 137—503 |
| 2,737,197 | 3/1956 | Jaseph | 137—487 |
| 2,990,848 | 7/1961 | Wilson | 137—503 |
| 3,057,160 | 10/1962 | Russell | 60—52 |
| 3,020,892 | 2/1962 | Arbogast et al. | 91—446 |

CARROLL B. DORITY, JR., Primary Examiner

U.S. Cl. X.R.

91—433, 446; 137—487, 503